(12) United States Patent
Wu

(10) Patent No.: US 12,510,205 B2
(45) Date of Patent: Dec. 30, 2025

(54) MONITOR CONNECTOR AND A MONITOR BRACKET USING IT

(71) Applicant: Linfei Wu, Ningbo (CN)

(72) Inventor: Linfei Wu, Ningbo (CN)

( * ) Notice: Subject to any disclaimer, the term of this patent is extended or adjusted under 35 U.S.C. 154(b) by 127 days.

(21) Appl. No.: 18/370,430

(22) Filed: Sep. 20, 2023

(65) Prior Publication Data

US 2025/0092984 A1  Mar. 20, 2025

(51) Int. Cl.
  *F16M 11/00* (2006.01)
  *F16M 11/12* (2006.01)
  *F16M 11/28* (2006.01)
  *F16M 11/42* (2006.01)

(52) U.S. Cl.
  CPC ........... *F16M 11/123* (2013.01); *F16M 11/28* (2013.01); *F16M 11/42* (2013.01)

(58) Field of Classification Search
  None
  See application file for complete search history.

(56) References Cited

U.S. PATENT DOCUMENTS

| | | | |
|---|---|---|---|
| 6,378,830 B1* | 4/2002 | Lu | F16M 11/2014 16/337 |
| 9,835,288 B1* | 12/2017 | Matthews | F16M 13/02 |
| 2002/0174519 A1* | 11/2002 | Huang | F16M 11/10 16/319 |
| 2003/0227739 A1* | 12/2003 | Kim | F16M 11/10 361/679.06 |
| 2004/0203282 A1* | 10/2004 | Lim | F16M 11/24 439/577 |
| 2004/0262474 A1* | 12/2004 | Boks | F16M 11/24 248/282.1 |
| 2005/0201046 A1* | 9/2005 | Hwang | F16M 11/105 361/679.06 |

* cited by examiner

*Primary Examiner* — Steven M Marsh
(74) *Attorney, Agent, or Firm* — Jose Cherson Weissbrot

(57) ABSTRACT

The present invention provides a monitor connector and a monitor bracket, the monitor connector comprising a panel component and a connection component, the panel component is composed of a panel and a panel connector, the panel and the panel connector are respectively equipped with a first quick assembly structure and a second quick assembly structure, the first quick assembly structure and the second quick assembly structure are detachably connected, constructed as a quick assembly structure, the connection component includes a U-shaped connector and a connector block, one side of the U-shaped connector is equipped with a polygonal hole, the connector block has at least two grooves opened in the horizontal direction, the groove is embedded with a hemispherical plastic part, the hemispherical plastic part is connected with a polygonal gasket, the polygonal hole is embedded with a polygonal nut to form fixation. The monitor bracket is a bracket using it.

20 Claims, 21 Drawing Sheets

MONITOR CONNECTOR AND A MONITOR BRACKET USING IT

TECHNICAL FIELD

The present invention relates to the technical field of connection brackets, in particular to a monitor connector and a monitor bracket using it.

BACKGROUND

Currently, flat panel displays are widely used as computer display devices due to their light weight, thin screens, and attractive appearance. Typically, the flat panel display is mounted on a monitor bracket base, which is placed directly on the desktop and allows the flat panel display to adjust its front tilt angle. However, there are various disadvantages to the monitor bracket bases currently on the market, such as complicated installation, inconvenient disassembly, or easy loosening leading to insufficient load-bearing capacity, etc.

U.S. Patent no. 20120138754 discloses a universal frame for a flat panel display. The connection plate of the frame is connected to the display by bolts, and there are multiple bolts on the connection plate to fix the display. Although this connection method is stable and not easy to loosen, it requires the installation of multiple bolt structures, which is not convenient for the installation and disassembly of the display.

European patent no. 1821028 discloses a monitor bracket that is connected to the monitor through a ball joint. The connection method is plug-in connection without auxiliary fixation. Although this connection method is convenient and fast, it makes the monitor easy to loosen and poses a risk of falling.

Based on these problems, it is necessary to propose a new type of monitor connector. This monitor connector has a quick assembly structure, which facilitates the quick connection and disassembly of the connector and the monitor. At the same time, through its unique design structure, this monitor connector enhances the load-bearing capacity of the monitor connector. The stability of the monitor connection is improved and it is not easy to shake, further improving the user's experience.

SUMMARY

The present invention provides a monitor connector, comprising:
a panel component and a connection component, wherein
said panel component is composed of a panel and a panel connector, where said panel and said panel connector are respectively equipped with a first quick assembly structure and a second quick assembly structure, said first quick assembly structure and said second quick assembly structure are detachably connected, constructed as a quick assembly structure; and
said connection component includes a U-shaped connector and a connector block, where one side of said U-shaped connector is equipped with a polygonal hole, said connector block has at least two grooves opened in the horizontal direction, said groove is embedded with a hemispherical plastic part, said hemispherical plastic part is connected with a polygonal gasket, said polygonal hole is embedded with a polygonal nut to form fixation; and
wherein, said polygonal nut rotates with the rotation of said U-shaped connector, said panel connector and said U-shaped connector are connected by multiple gaskets and fasteners to form a riveting connection method, making said panel component and said connection component detachably connected.

The present invention also provides a monitor bracket, comprising:
a monitor connector and a support component, wherein said monitor connector includes a panel component and a connection component, said panel component is composed of a panel and a panel connector, said panel and said panel connector are respectively equipped with a first quick assembly structure and a second quick assembly structure, said first quick assembly structure and said second quick assembly structure are detachably connected, constructed as a quick assembly structure, said connection component includes a U-shaped connector and a connector block, one side of said U-shaped connector is equipped with a polygonal hole, said connector block has at least two grooves opened in the horizontal direction, and at least two connection holes in the vertical direction, said groove is embedded with a hemispherical plastic part, which is connected with a polygonal gasket, said polygonal hole is embedded with a polygonal nut to form fixation, said polygonal nut rotates with the rotation of said U-shaped connector, said panel connector and said U-shaped connector are connected by multiple gaskets and fasteners to form a riveting connection method, making said panel component and said connection component detachably connected; and
said support component includes a lifting device, a, support rod inserted in said lifting device, and a fixed seat, said support rod is fixed at the top of said fixed seat, said fixed seat is constructed to fix and support said monitor bracket; and
one end of said lifting device is detachably connected to said connector block by fasteners, connecting said monitor connector and said support component.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the drawings.

Figure 1:
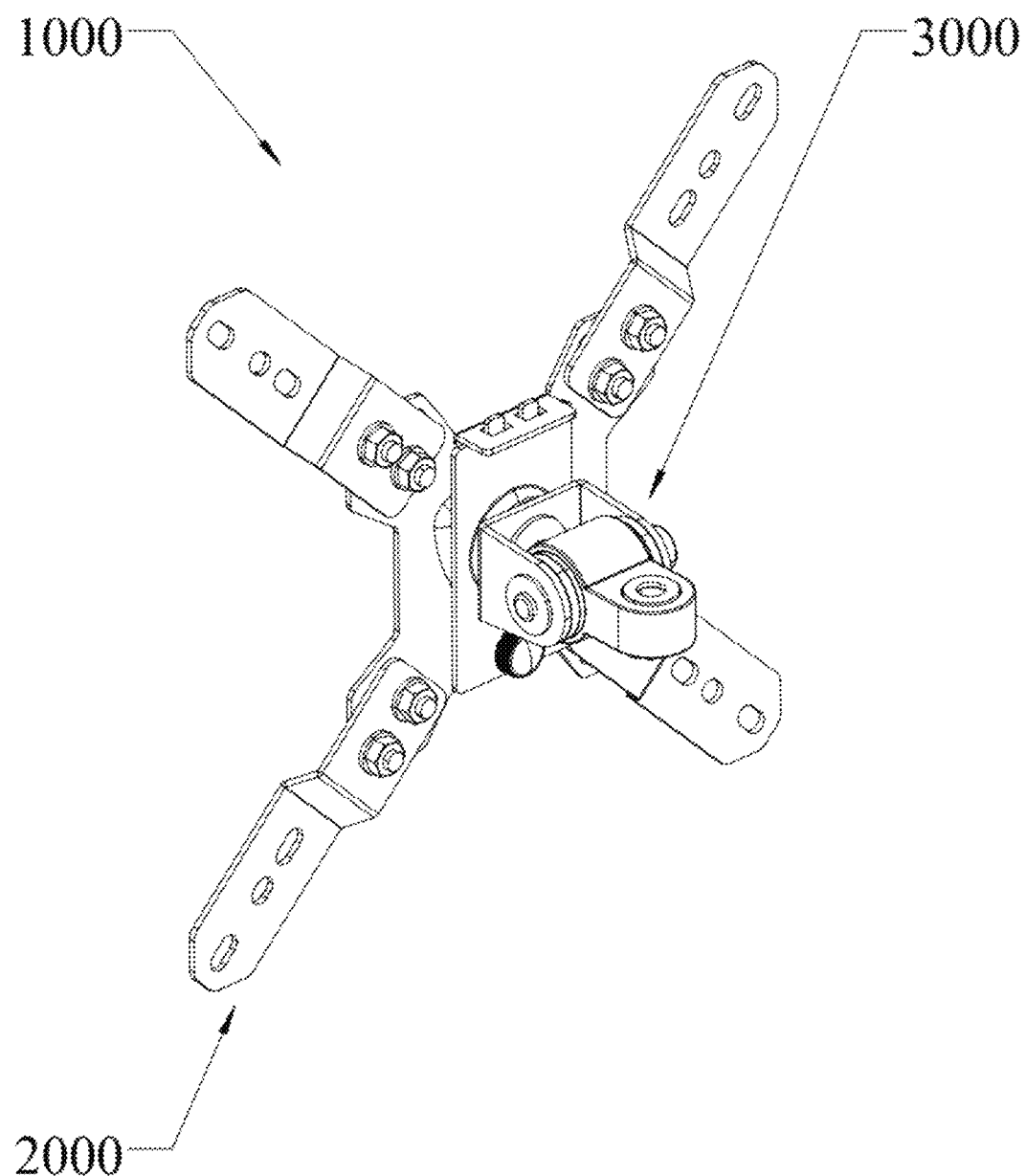
FIG. 1 is a schematic diagram of the monitor connector in this invention application.

1000, monitor connector; 2000, panel component; 2100, panel; 2200, panel connector; 2230, adjustment hole; 2231, fastening knob; 2300, the first quick assembly structure; 2400, the second quick assembly structure; 3000, connection component; 3101, first connector; 3102, second gasket; 3103, third gasket; 3100, U-shaped connector; 3110, polygonal hole; 3111, round hole; 3120, polygonal nut; 3200, connector block; 3210, groove; 3220, hemispherical plastic part; 3221, raised part; 3230, polygonal gasket; 3240, connection hole; 4000, monitor bracket; 5000, support component; 5100, the first shelf; 5150, the second shelf; 5200, lifting device; 5300, support rod; 5400, fixed seat; 5410, mobile device.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As a preferred embodiment of this invention, in order to make the monitor connector have a quick assembly structure, be firmly installed and can adjust the specified angle at will, this invention provides a monitor connector 1000.

Referring to FIG. 1, the monitor connector 1000 applied for by this invention includes a panel component 2000 and a connection component 3000.

Figure 2:
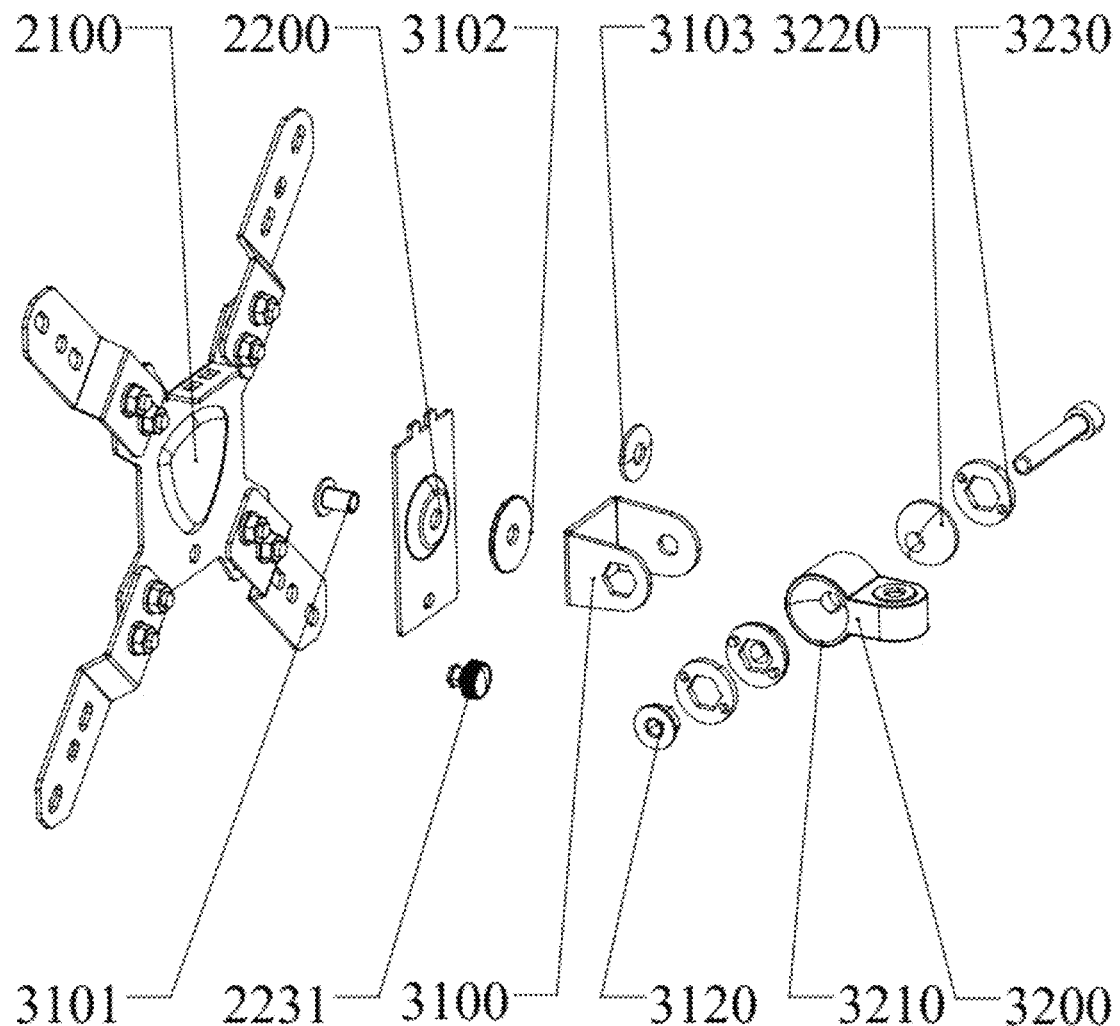
FIG. 2 is an exploded view of the monitor connector in this invention application.
Figure 3:
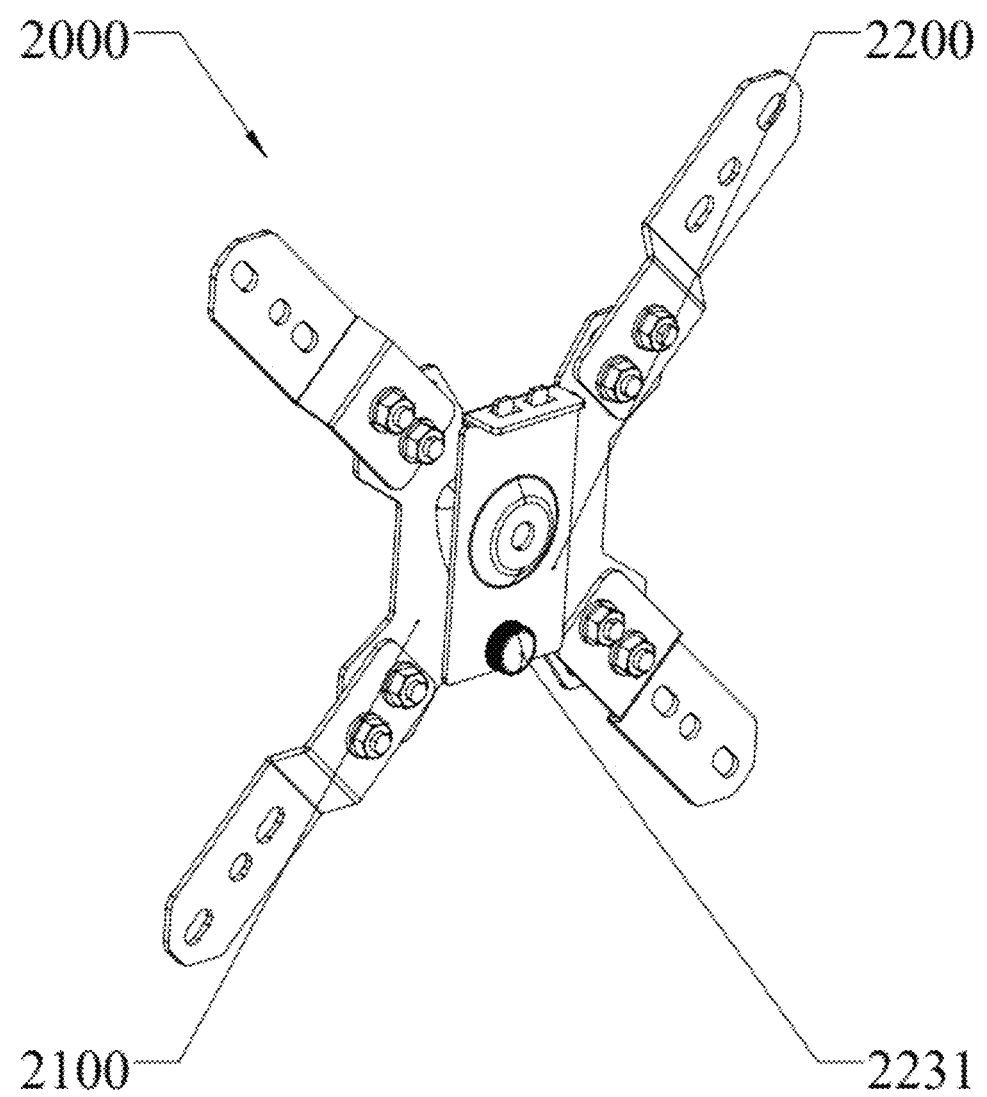
FIG. 3 is a schematic diagram of the panel component in this invention application.

Referring to FIGS. 2 and 3, the panel component 2000 is composed of a panel 2100 and a panel connector 2200.

Figure 4:
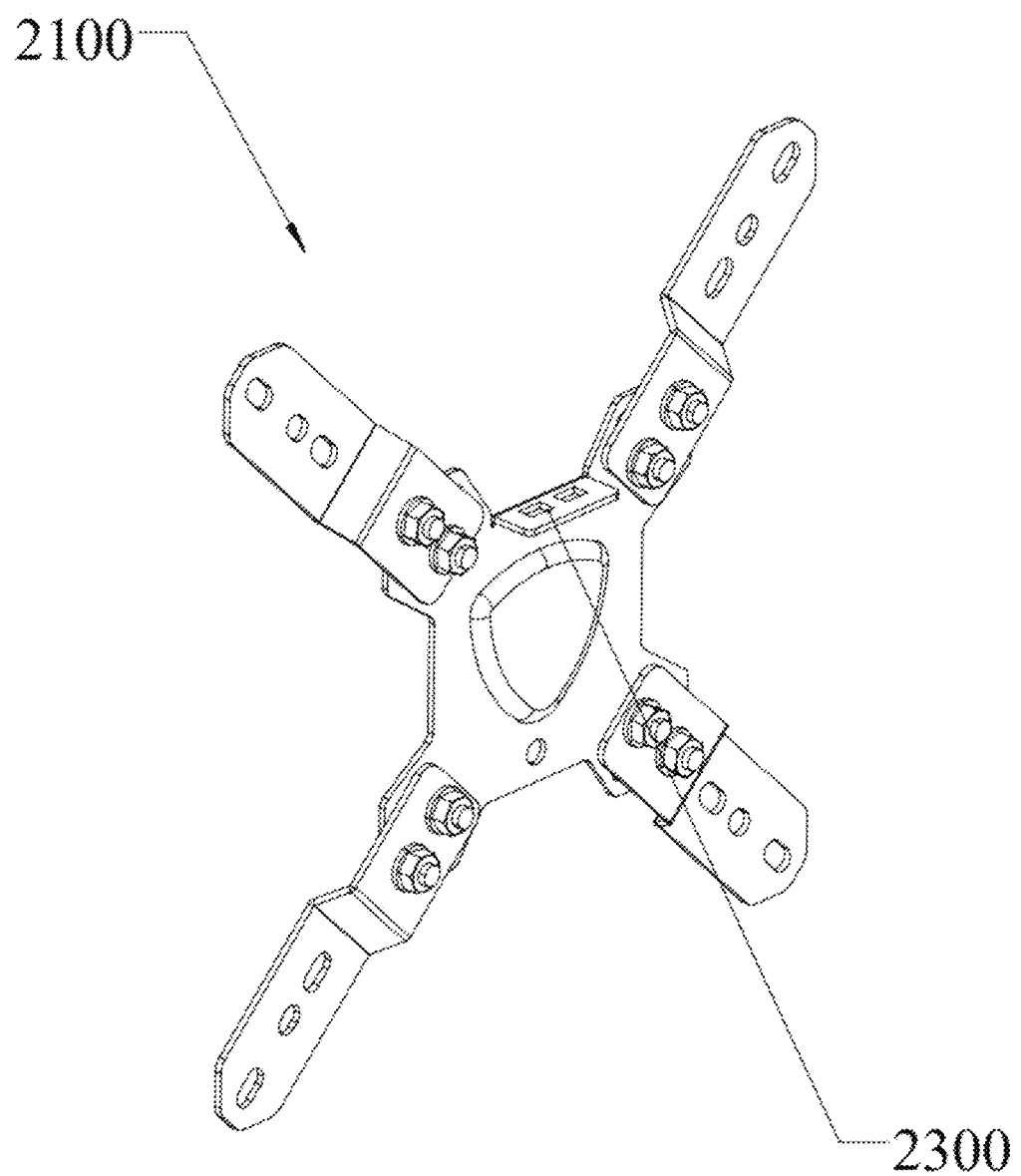
FIG. 4 is a schematic diagram of the panel in this invention application.

Referring to FIG. 4, the panel 2100 is roughly diamond-shaped. In some embodiments (not shown), the shape of the panel 2100 can also be rectangular, square, elliptical, or any other geometric shape, curved and irregular shape. In this embodiment, the material of the panel 2100 is aluminum alloy material. The aluminum alloy material has the advantages of lightweight structure and strong decoration. In some embodiments, the material can also be carbon steel or other rigid materials such as plastic.

Figure 5:
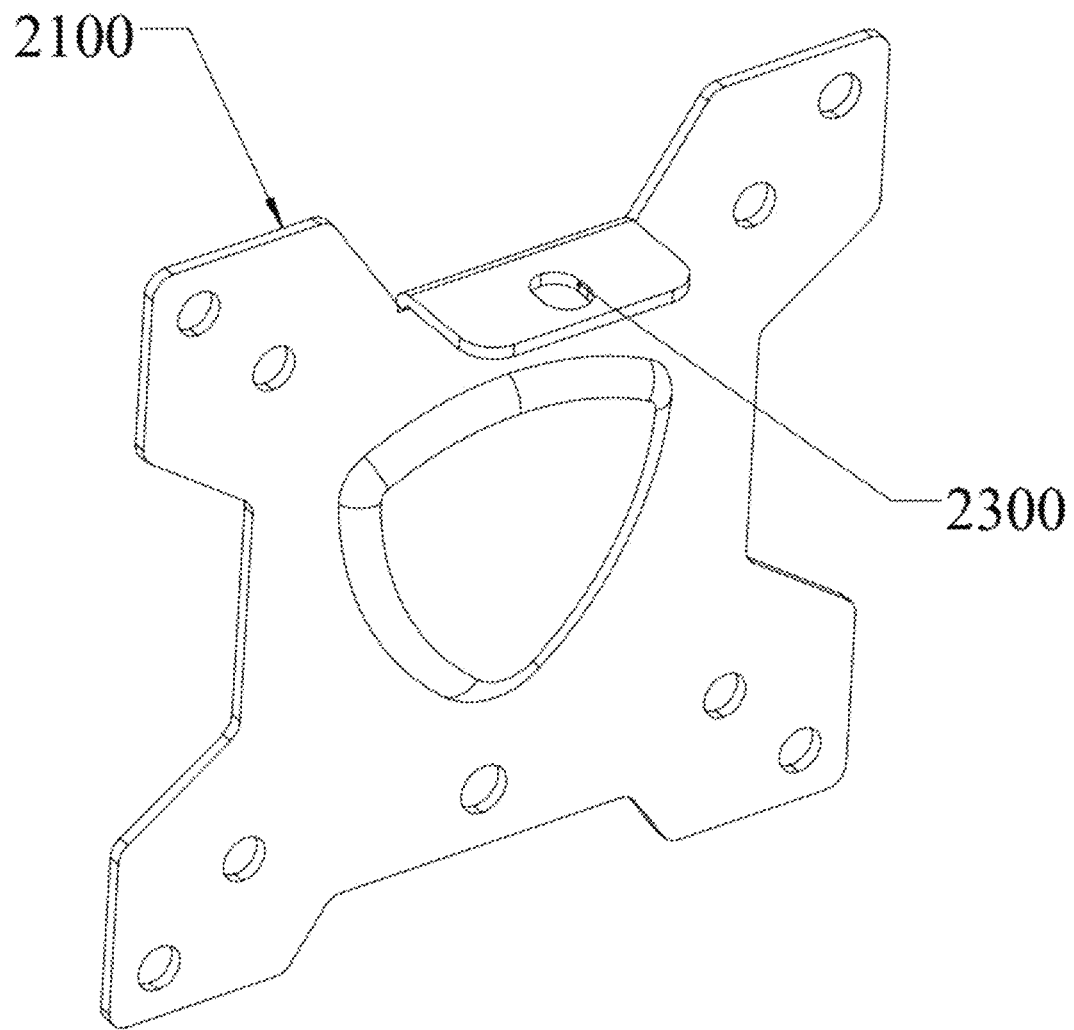
FIG. 5 is a schematic diagram of another embodiment of the panel in this invention application.

Preferably, in this embodiment, there is a curved extension part on the top of the panel 2100. The first quick assembly structure 2300 is set on the curved extension part. The first quick assembly structure 2300 is two square holes. In some embodiments (see FIG. 5), the first quick assembly structure 2300 can be a round hole. In other embodiments (not shown), the shape of the first quick assembly structure 2300 can be diamond-shaped or elliptical or any other geometric shape structure, curved and irregular shape structure. And the first quick assembly structure 2300 can be composed of one or more other number configured components.

Further, there are multiple threaded holes penetrating the surface of the panel 2100, which are fixed on the back of the monitor with bolts. This connection method makes the connection between the panel 2100 and the monitor stable and detachable. In other embodiments (not shown), the connection method between the panel 2100 and the monitor can also use buckle connection, magnetic suction connection, latch connection and other methods.

Figure 6:
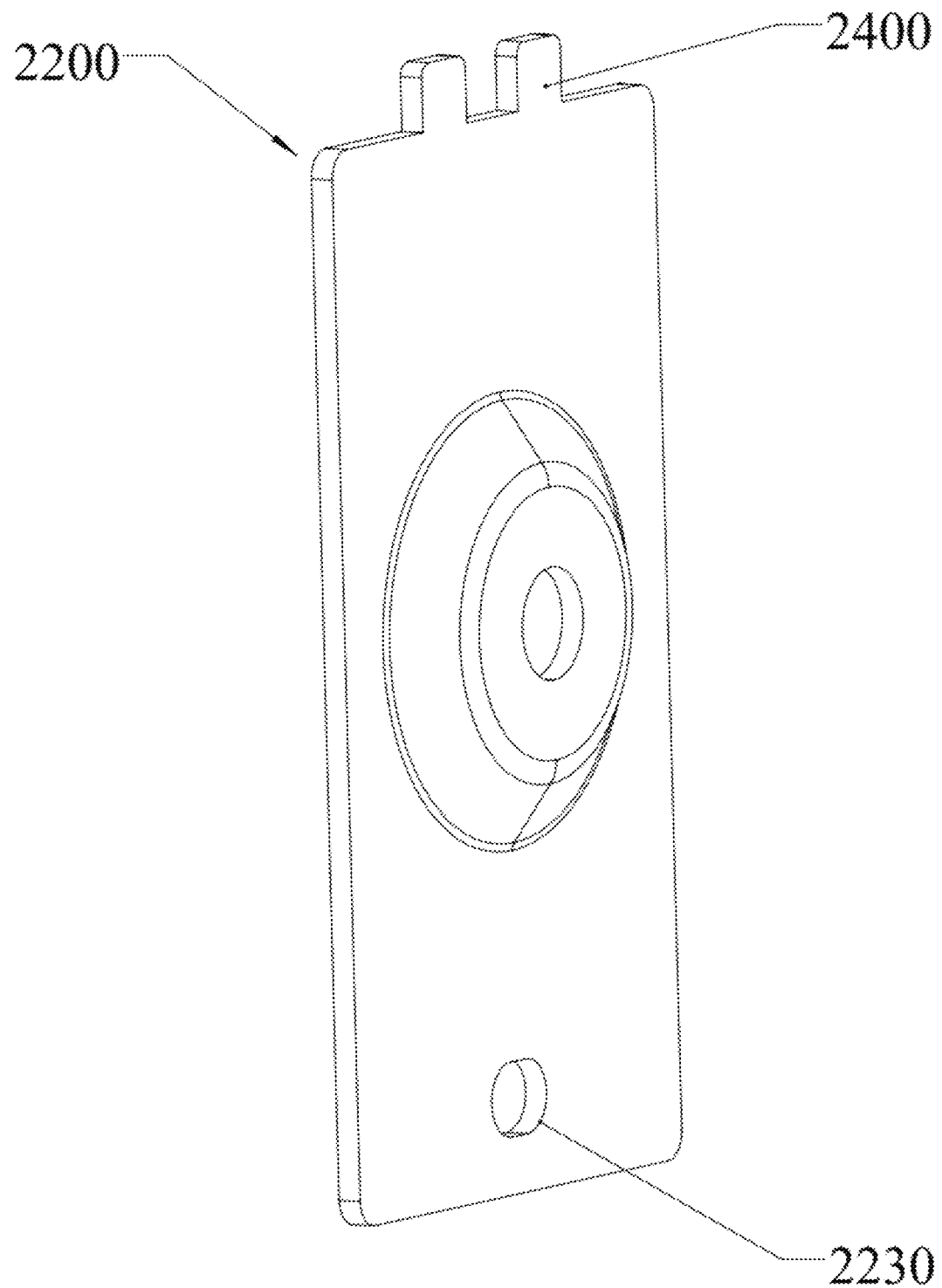
FIG. 6 is a schematic diagram of the panel connector in this invention application.

Referring to FIG. 6, the panel connector 2200 is rectangular in shape. In some embodiments (not shown), the shape of the panel 2100 can also be circular, diamond-shaped, elliptical, or any other geometric shape, curved and irregular shape. In this embodiment, the material of the panel connector 2200 is aluminum alloy material. The aluminum alloy material has the advantages of lightweight structure and strong decoration. In some embodiments, the material can also be carbon steel or other rigid materials such as plastic.

Figure 7:
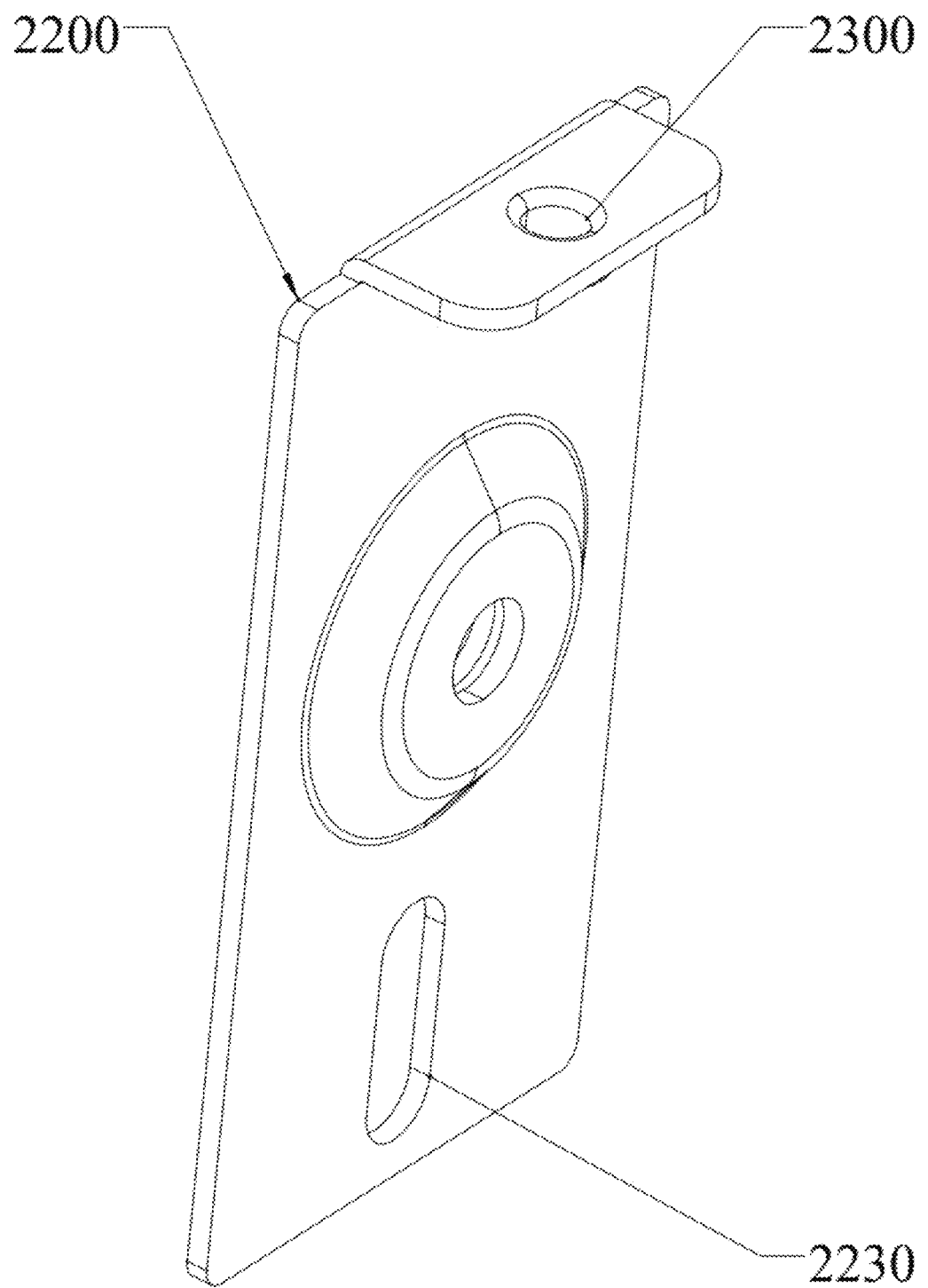
FIG. 7 is a schematic diagram of another embodiment of the panel connector in this invention application.

Further, in this embodiment, there is also a curved extension part on the top of the panel connector 2200. The second quick assembly structure 2400 is set on the curved extension part. The second quick assembly structure 2400 consists of two protruding structures. In some embodiments (see FIG. 7), the second quick assembly structure 2400 can be a round hole. In other embodiments (not shown), the shape of the first quick assembly structure 2300 can be diamond-shaped or elliptical or any other geometric shape, curved and irregular shape. And the second quick assembly structure 2400 can be composed of one or more other number configured components.

Further, the panel connector 2200 has a first position and a second position. The first position is the surface where the panel connector 2200 fits with the panel 2100, and the second position is the side far away from the panel 2100. The first position is close to the panel 2100 and is used to support the monitor. There is a recessed part on the first position of the panel connector 2200 for placing the first connector 3101. The second position has a protruding part.

The lower end of the panel connector 2200 has a round adjustment hole 2230. The adjustment hole 2230 is used to connect with the threaded hole below the panel 2100 to strengthen the connection. In other embodiments (see FIG. 7), the shape of adjustment hole 2230 can also be runway-shaped. The runway shape is a shape combined with a square and two semicircles. In some embodiments (not shown), the shape of adjustment hole 2230 can also be rectangular, square, elliptical, or any other geometric shape, curved and irregular shape.

Further, as shown in FIG. 3, there is a corresponding fastening knob 2231 on the adjustment hole 2230. The fastening knob 2231 connects the adjustment hole 2230 and the threaded hole on the panel 2100, thereby playing a role in strengthening the connection between the panel connector 2200 and the panel 2100.

Figure 8:
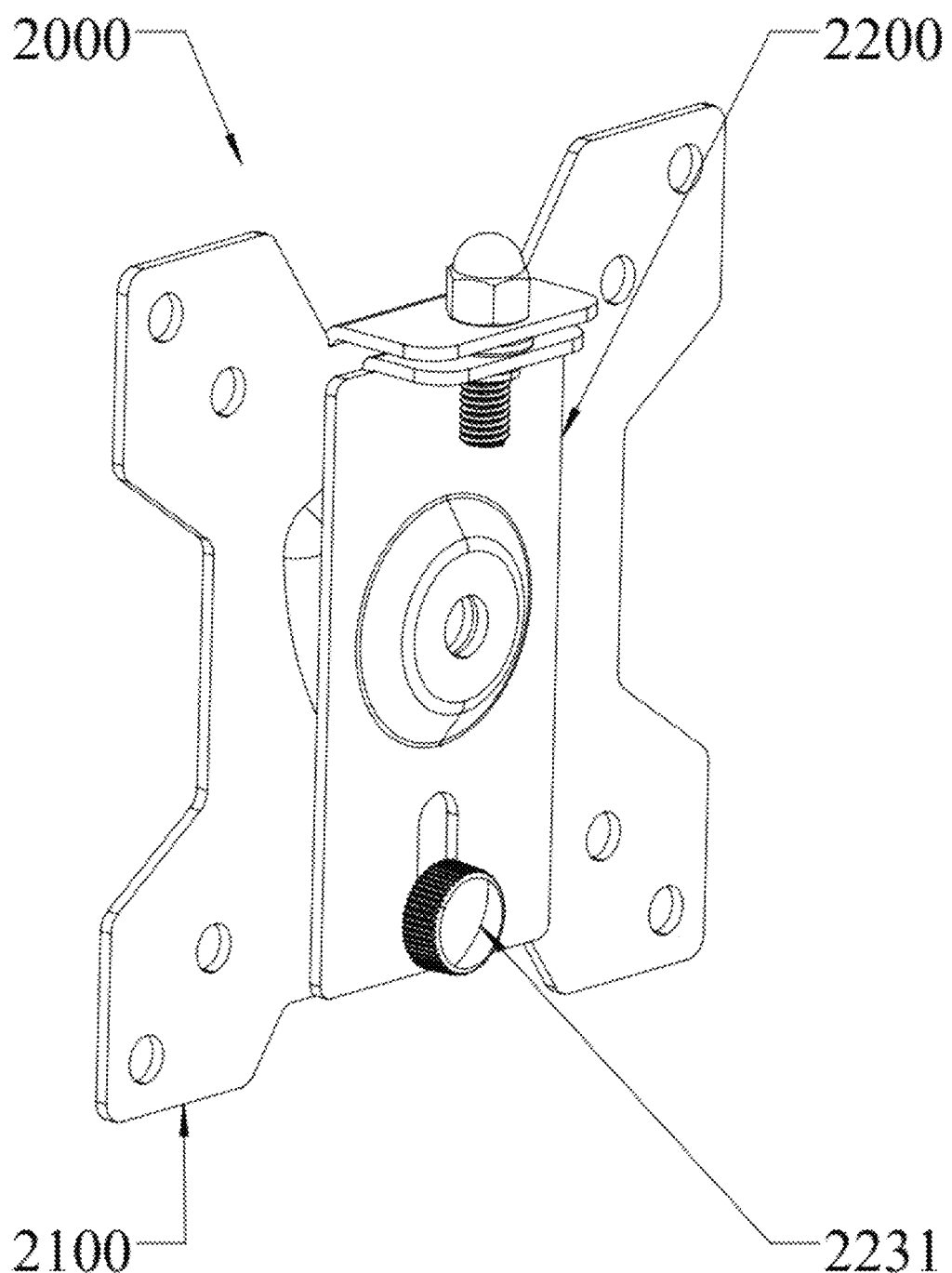
FIG. 8 is a schematic diagram of another embodiment of the panel component in this invention application.

Specifically, as shown in FIG. 3, the panel 2100 is placed on the upper end of the panel connector 2200. One side of the panel 2100 is connected to the monitor, and the other surface is connected to the first position of the panel connector 2200. The first quick assembly structure 2300 corresponds to the second quick assembly structure 2400 to form a detachable quick assembly structure. The first quick assembly structure 2300 is fixed to the second quick assembly structure 2400 by a buckle connection method. The first quick assembly structure 2300 can be directly hooked on the second quick assembly structure 2400. This connection method can achieve quick installation without relying on other tools, which has the advantage of being convenient and fast. In some embodiments (see FIG. 8), a bolt connection method can be used to achieve a quick assembly structure. In other embodiments (not shown), other methods such as buckle connection, magnetic suction connection, or latch connection can be used for connection. The adjustment hole 2230 and fastening knob 2231 can adjust the tightness of the panel 2100 and panel connector 2200. Among them, the panel 2100 is fixed on the back of the monitor. When you need to use the monitor connector, you only need to fix the panel 2100 on the upper end of the panel connector 2200 through the connection of the first quick assembly structure 2300 and the second quick assembly structure 2400. The design of this installation structure can achieve rapid installation and disassembly. At the same time, the dual fixation of fastening knob 2231 and quick assembly hole makes the overall connection more solid and convenient to use.

Figure 9:
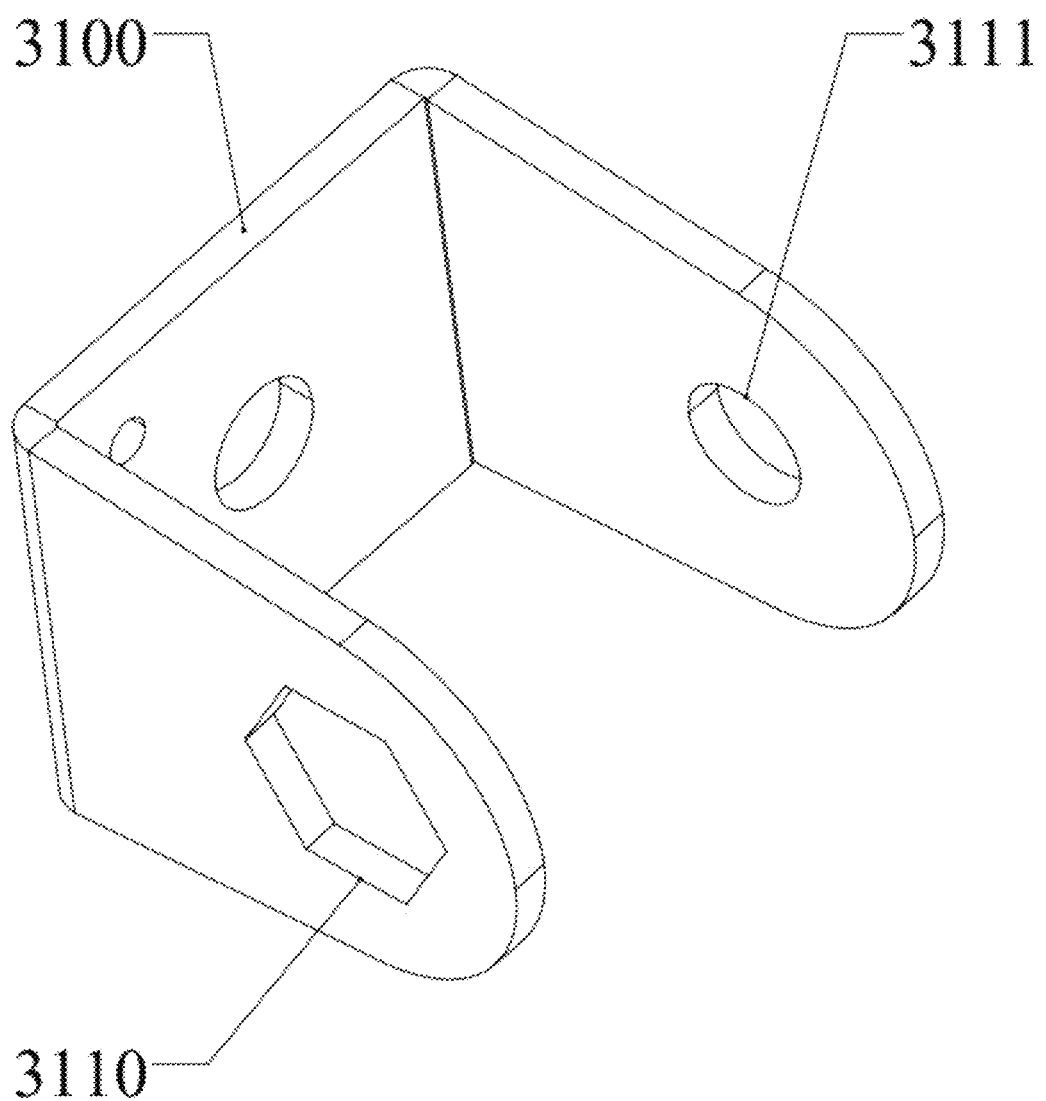
FIG. 9 is a schematic diagram of the U-shaped connector in this invention application.

Referring to FIG. 9, U-shaped connector 3100 is roughly "U"-shaped with a threaded hole at its bottom. There are holes penetrating both sides of U-shaped connector 3100, one side being round hole 3111 and another side being polygonal hole 3110. Round hole 3111 and polygonal hole 3110 are concentric structures, that is, their centers are on the same horizontal line.

Further, the polygonal hole 3110 is a hexagonal hole. Using a hexagonal hole can make the U-shaped connector 3100 withstand greater tightening force, improve the flatness and aesthetics of the surface, and at the same time, the hexagonal hole is not easy to be disassembled by general tools, enhancing safety. In other embodiments (not shown), the shape of the hole can also be rectangular, circular, pentagonal or other geometric shapes.

It should be further explained that the structure of the U-shaped connector 3100 is not limited to the shapes listed above (not shown). Those skilled in the art can flexibly adjust and set the structure shape of the U-shaped connector 3100 in actual applications, as long as it can make the U-shaped connector 3100 have sufficient strength and can be connected and fixed with other parts. For example, it can be T-shaped, L-shaped, trapezoidal, or other character and geometric shapes.

Figure 10:
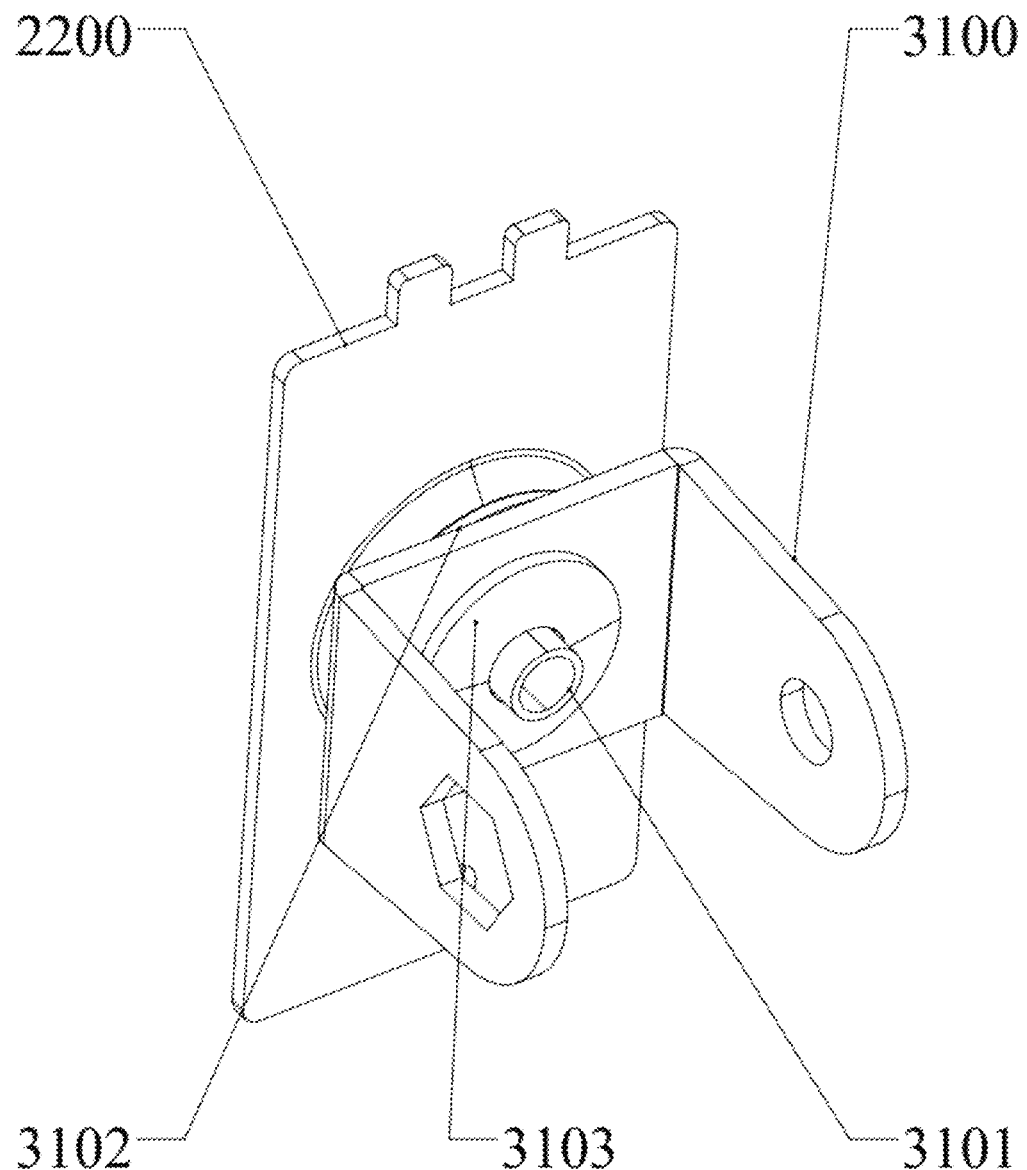
FIG. 10 is a schematic diagram of the part connection in this invention application.

Referring to FIGS. 2 and 10, the panel connector 2200 and the U-shaped connector 3100 are riveted together through multiple gaskets and fasteners, so that the panel component 2000 and connection component 3000 can be detachably connected. Among them, the fastener is the first connector 3101. The first connector 3101 is a bolt. The gaskets are respectively the second gasket 3102 and third gasket 3103.

Specifically, the first connector 3101 is attached to the first position of the panel connector 2200 and placed in the recessed pail of the first position. The second gasket 3102 is placed between the panel connector 2200 and U-shaped connector 3100, respectively contacting with their surfaces. The third gasket 3103 is attached to another surface of U-shaped connector 3100. The panel connector 2200 and U-shaped connector 3100 are detachably connected. The first connector 3101 passes from panel connector 2200 to U-shaped connector 3100 to form a connection fixation. In other embodiments (not shown), other methods such as buckle connection, magnetic suction connection, or latch connection can be used for connection.

Figure 11:
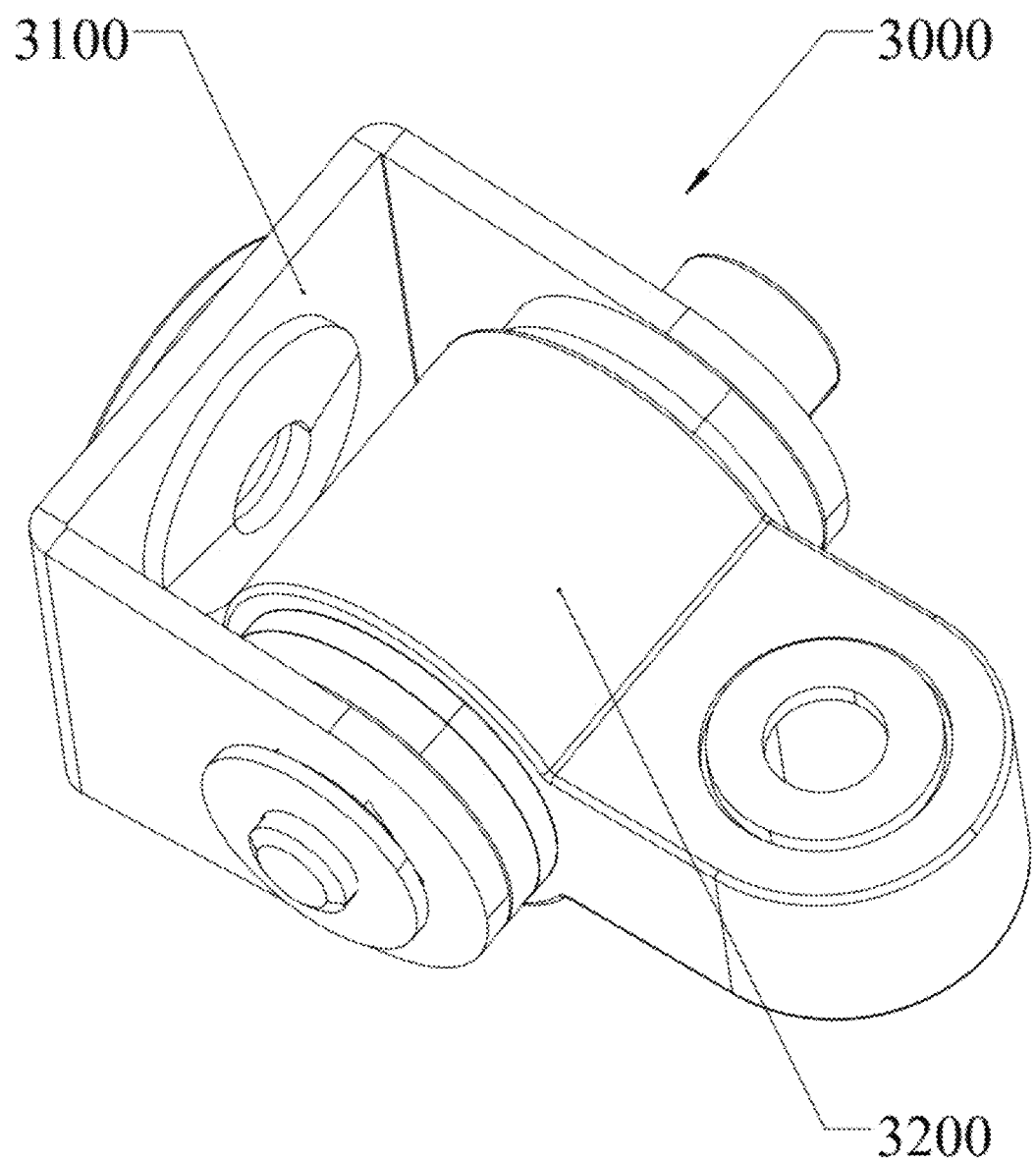
FIG. 11 is a schematic diagram of the connection component in this invention application.

Referring to FIG. 11, the connection component 3000 includes a U-shaped connector 3100 and a connector block 3200.

Figure 12:
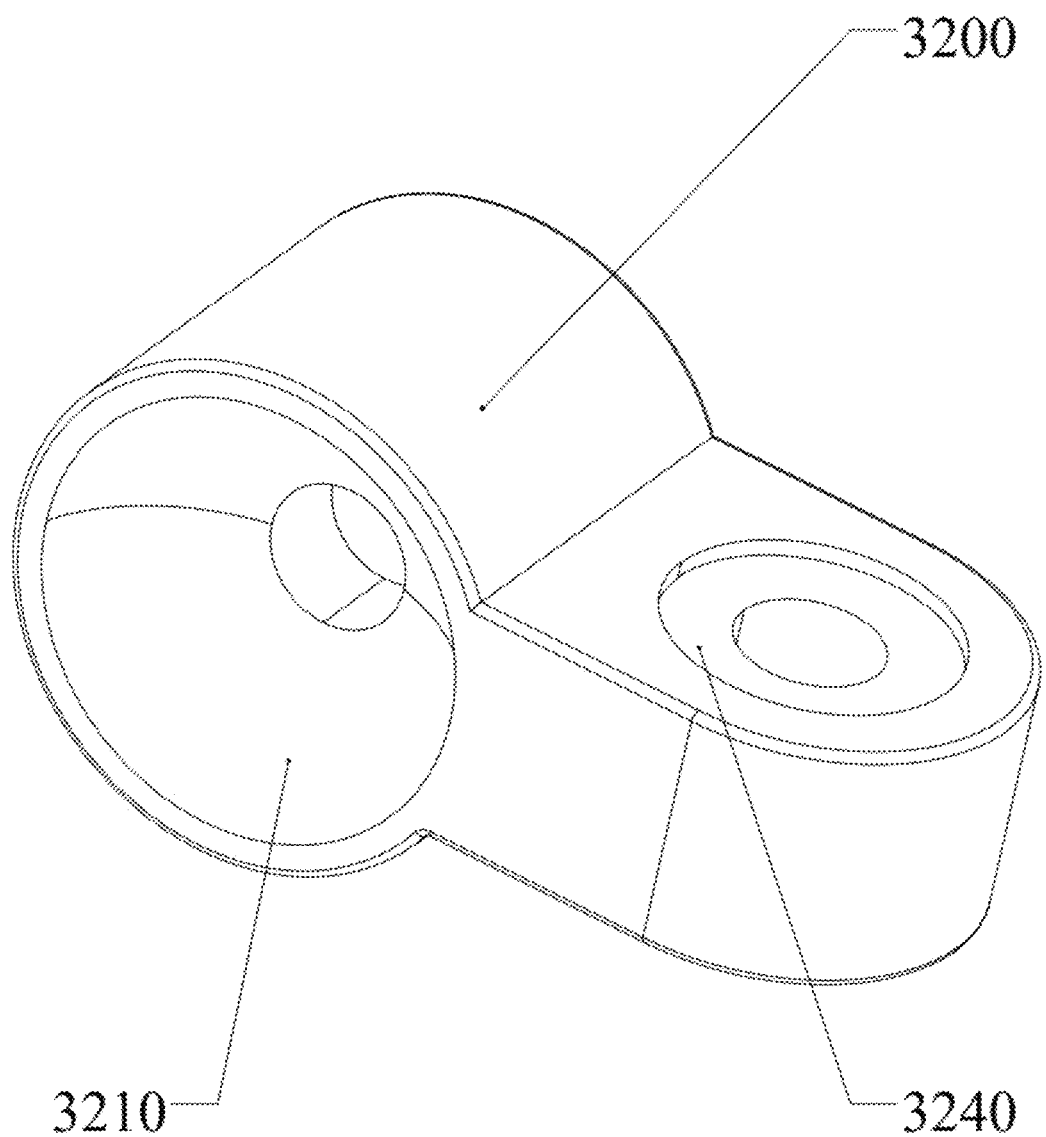
FIG. 12 is a schematic diagram of the connector block in this invention application.

Referring to FIG. 12, the interior of the connector block 3200 is hollow, and there are at least two connection holes 3240 in the vertical direction on the connector block 3200.

Figure 13:
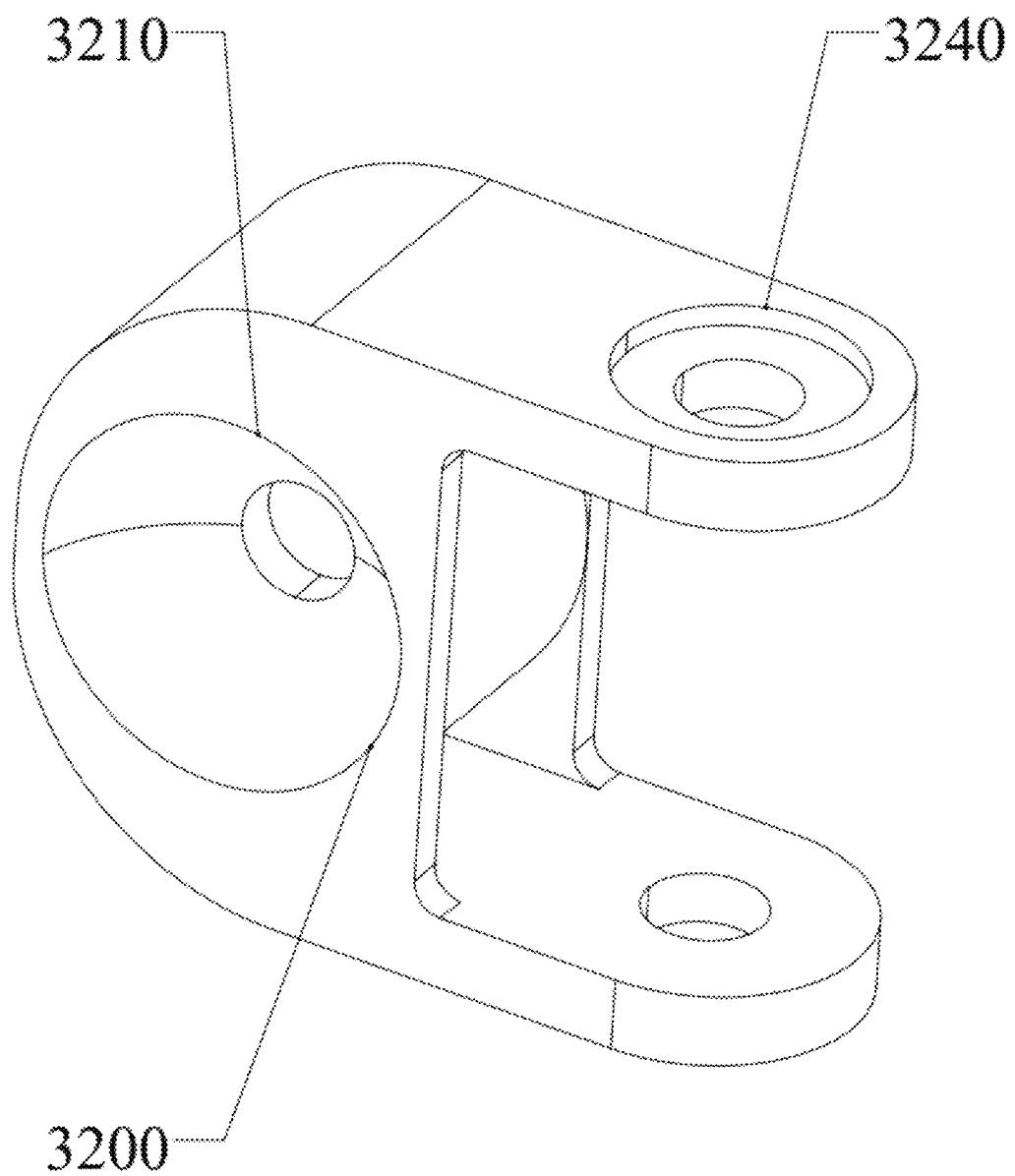
FIG. 13 is a schematic diagram of another embodiment of the connector block in this invention application.

In some embodiments (see FIG. 13), the connector block can also be roughly "C"-shaped. It should be further explained that the structure of the connector block 3200 is not limited to the shapes listed above. Those skilled in the art can flexibly adjust and set the structure shape of the connector block 3200 in actual applications, such as T-shaped, L-shaped, trapezoidal shape, or other character and geometric shapes, as long as it can make the connector block 3200 have sufficient strength and can be connected and fixed with other parts.

Further, as shown in FIG. 2, hemispherical groove 3210 are set on both sides of the connector block 3200 symmetrically. In other embodiments (not shown), the shape of groove 3210 can also be ellipsoidal, or cuboid, or other geometric shapes.

Further, as shown in FIG. 2, a hemispherical plastic part 3220 is embedded in groove 3210. The hemispherical plastic part 3220 completely fits with groove 3210. The hemispherical shape can make the contact area between the spherical surface and groove wall large. At the same time, the friction generated can bear part of the weight of the monitor connected to panel 2100 (not exceeding 15 kilograms), making it difficult for the monitor to shake. In other embodiments (not shown), the shape of hemispherical plastic part 3220 can also be ellipsoidal, or cuboid, or other geometric shapes.

Figure 14:
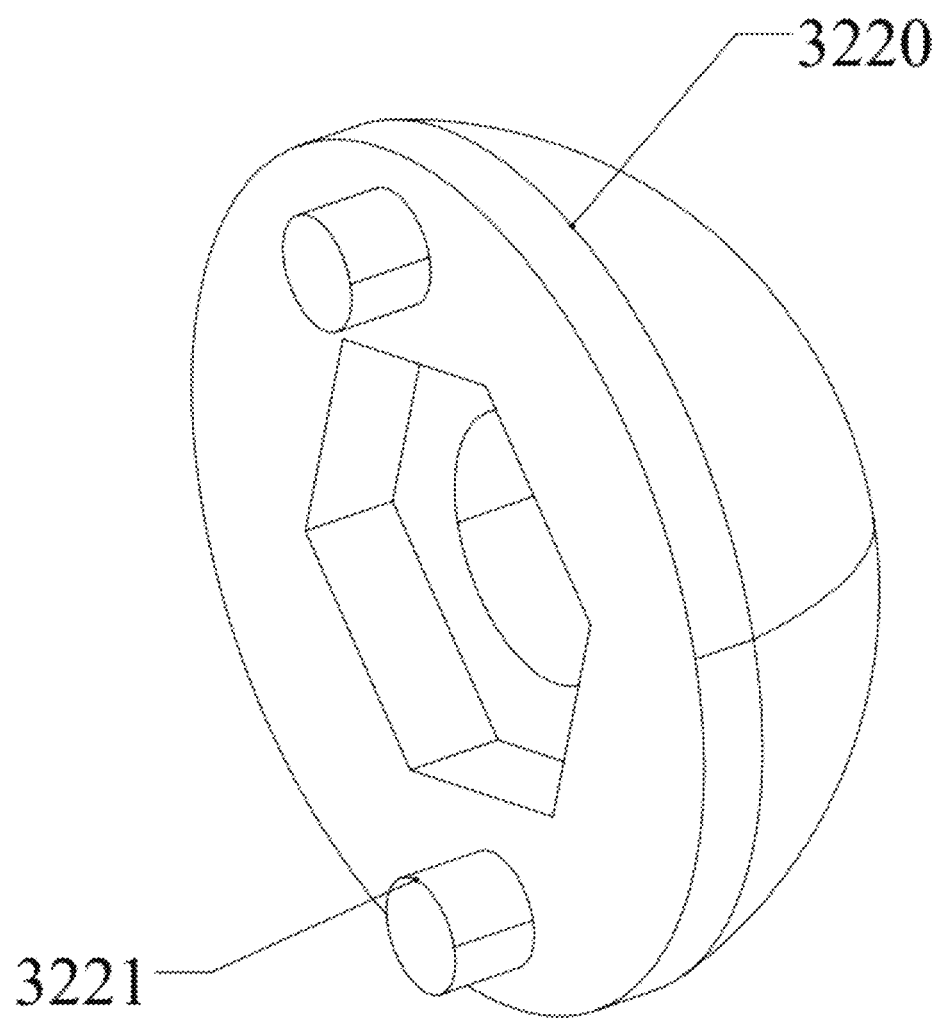
FIG. 14 is a schematic diagram of the hemispherical plastic part in this invention application.

Further, as shown in FIGS. 2 and 14, there is a roughly cylindrical raised part 3221 on hemispherical plastic part 3220 for connecting polygonal gasket 3230. Polygonal gasket 3230 has a corresponding plug-in hole set on it. The plug-in hole is sleeved on raised part 3221 so that hemispherical plastic part 3220 and polygonal gasket 3230 can be connected without relying on any tools.

In this embodiment, the polygonal gasket 3230 is a hexagonal gasket. The setting of the hexagonal gasket is to generate friction, which can bear part of the weight of the monitor connected to the panel 2100 and increase the stability when the connector connects the monitor. In some embodiments (not shown), other shapes of gaskets can also be used, such as circular gaskets, elliptical gaskets, rectangular gaskets, irregular gaskets and other geometric shapes of gaskets.

Specifically, as shown in FIGS. 2 and 11, when the U-shaped connector 3100 and connector block 3200 are connected, the hemispherical plastic part 3220 is placed in the groove 3210 on both sides of the connector block 3200, and the hemispherical plastic part 3220 fits closely with groove 3210. The raised part 3221 on hemispherical plastic pail 3220 is connected to polygonal gasket 3230. When the above components are connected and fixed on connector block 3200, connector block 3200 is connected inside U-shaped connector 3100 and fixed by a detachable bolt connection. The bolt is inserted from one end of round hole 3111 of U-shaped connector 3100 and comes out from polygonal hole 3110. Polygonal nut 3120 is embedded at polygonal hole 3110 to form a fixation.

Further, polygonal nut 3120 is a hexagonal nut. Using a hexagonal nut can withstand greater tightening force, improve the flatness and aesthetics of the surface, and at the same time, hexagonal holes are not easy to be disassembled by general tools, enhancing safety. In some embodiments (not shown), the shape of the nut can also be rectangular, circular, pentagonal or other geometric shapes.

In this embodiment, the monitor connector applied for by this invention is not only firmly installed but can also adjust specified angles at will. Connector block 3200 and U-shaped connector 3100 are rotatably connected. By rotating U-shaped connector 3100, the use angle of the monitor can be adjusted in all directions. Polygonal nut 3120 rotates with U-shaped connector 3100.

As a preferred embodiment of this invention, this invention provides a floor-standing monitor bracket using this monitor connector 1000.

Figure 15:
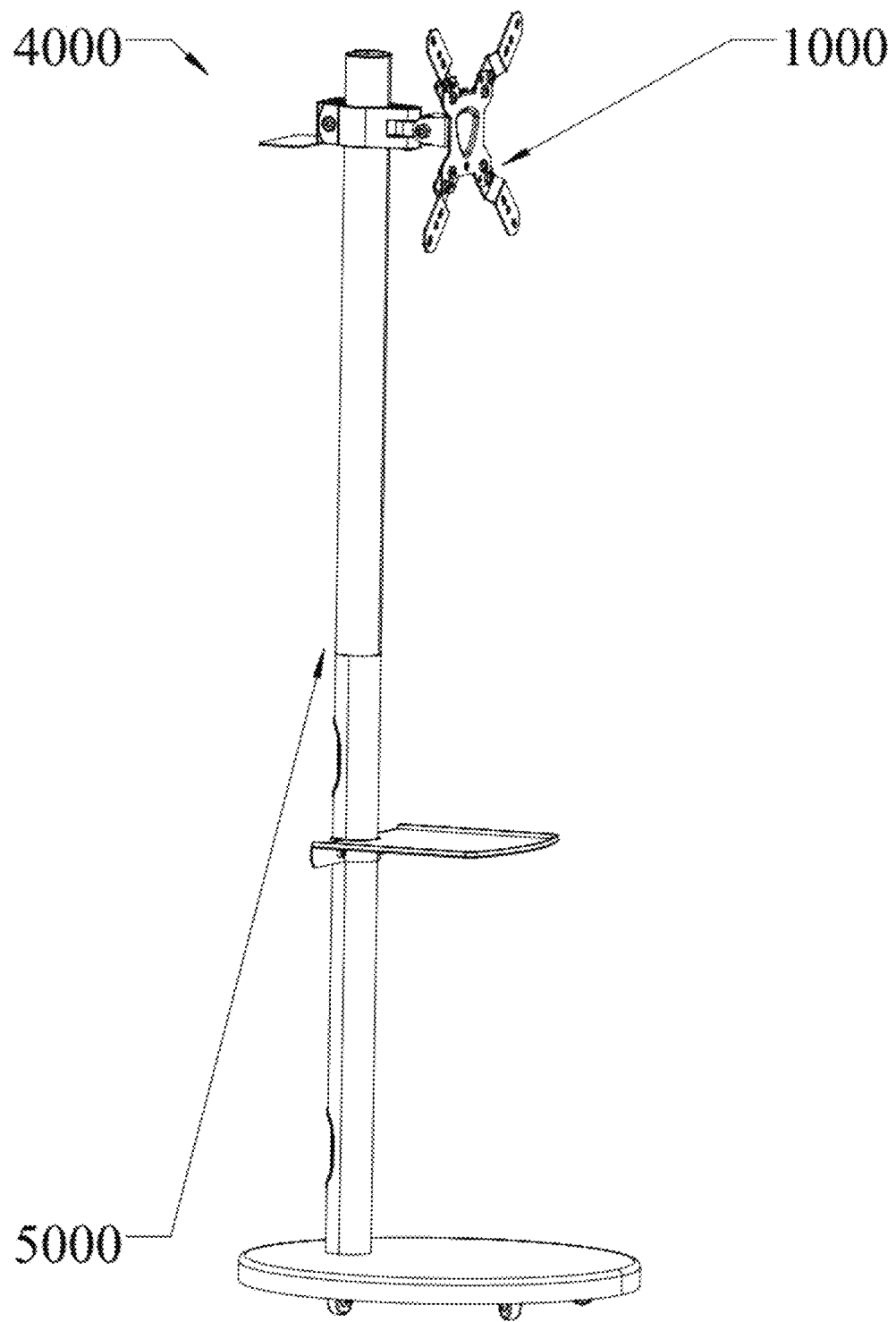
FIG. 15 is a schematic diagram of the monitor bracket in this invention application.
Figure 16:
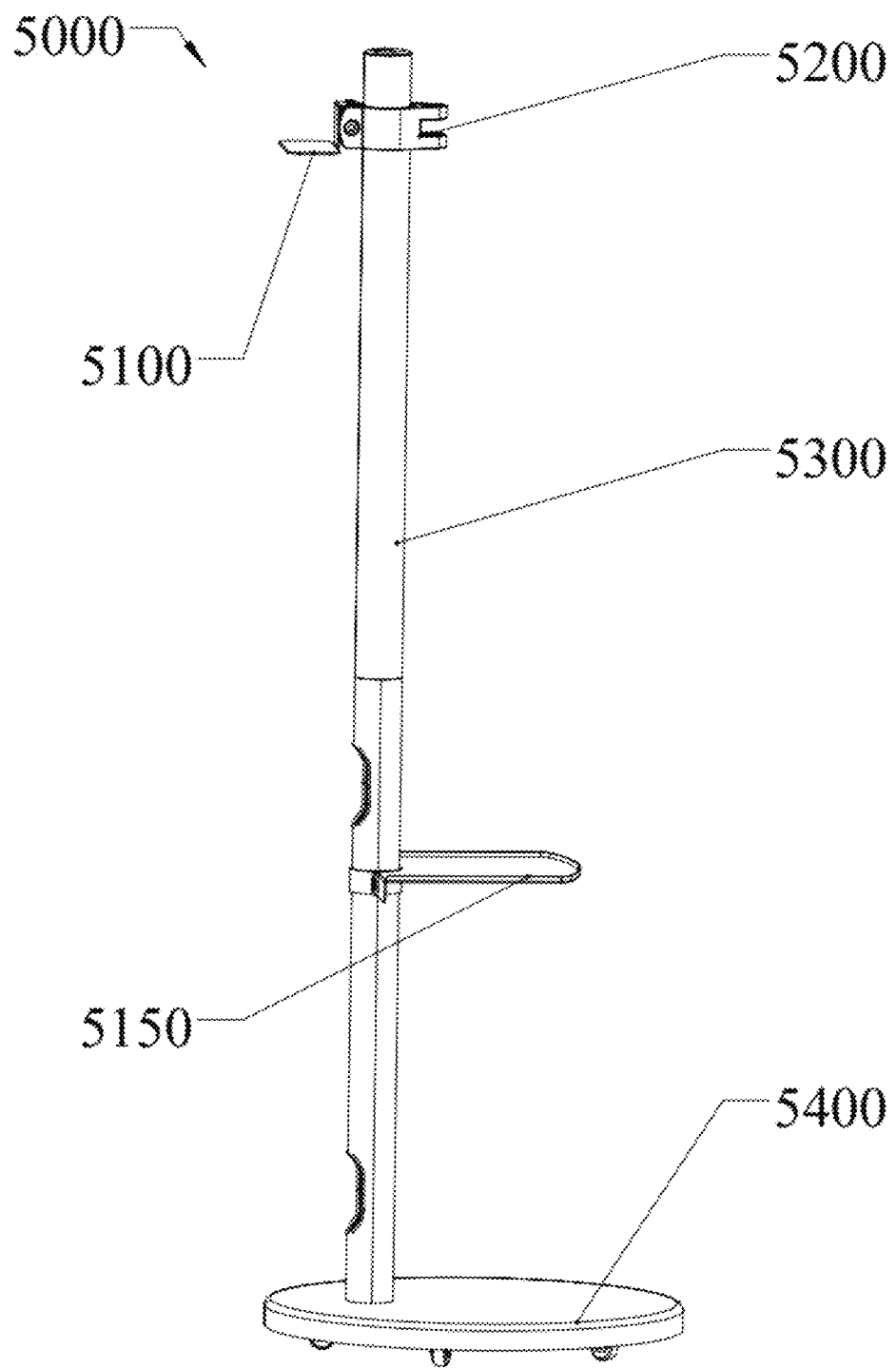
FIG. 16 is a schematic diagram of the support component in this invention application.
Figure 17:
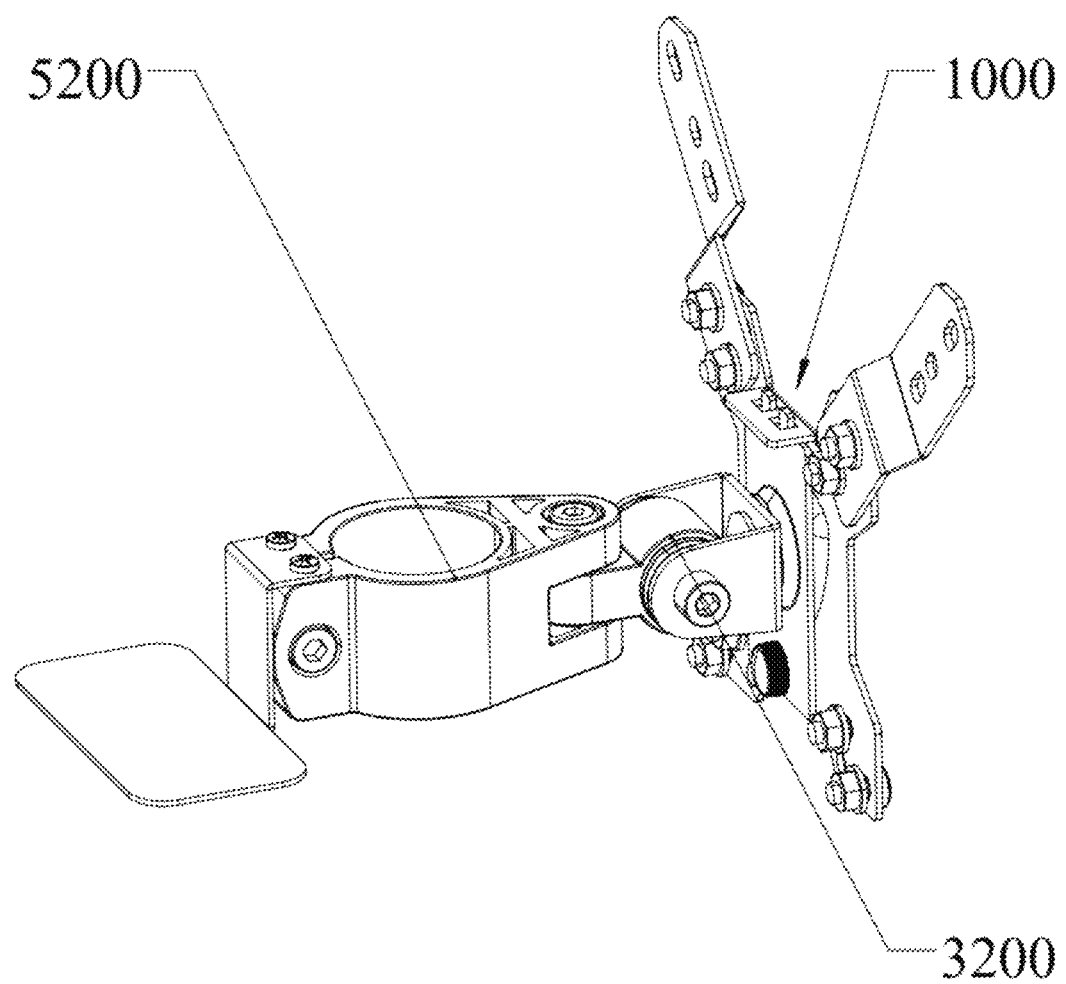
FIG. 17 is a schematic diagram of the part connection in this invention application.

In this embodiment, as shown in FIGS. 15 and 16, the monitor bracket 4000 includes a monitor connector 1000 and a support component 5000. The support component 5000 includes a lifting device 5200, a support rod 5300, and a fixed seat 5400.

As shown in FIG. 16, the middle part of the lifting device 5200 is a roughly cylindrical hollow structure, and the support rod 5300 is a cylindrical structure. The support rod 5300 is inserted into the hollow structure inside the lifting device 5200, so that the lifting device 5200 is sleeved on the periphery of the support rod 5300. The lifting device 5200 has a bolt reinforcement structure, which locks and reinforces the four sides of the support rod 5300, thereby forming a fixation along the circumferential direction.

Further, the lifting device 5200 has the first shelf 5100. The first shelf 5100 can be used to place items such as set-top boxes or plug-in boards. The periphery of the support rod 5300 is equipped with the second shelf 5150. The second shelf 5150 can be used to place other household items such as remote controls or potted plants. The first shelf 5100 and the second shelf 5150 are detachably connected to the lifting device 5200 and the support rod 5300 respectively through a bolt connection method.

Specifically, as shown in FIGS. 2 and 11, when the U-shaped connector 3100 and connector block 3200 are connected, the hemispherical plastic part 3220 is placed in the groove on both sides of connector block 3200, and hemispherical plastic part 3220 fits closely with groove. Hemispherical plastic part 3220's raised part connects to polygonal gasket. When these parts are connected and fixed on connector block 3200, connector block 3200 is connected inside U-shaped connector with bolt for detachable connection.

Figure 18:
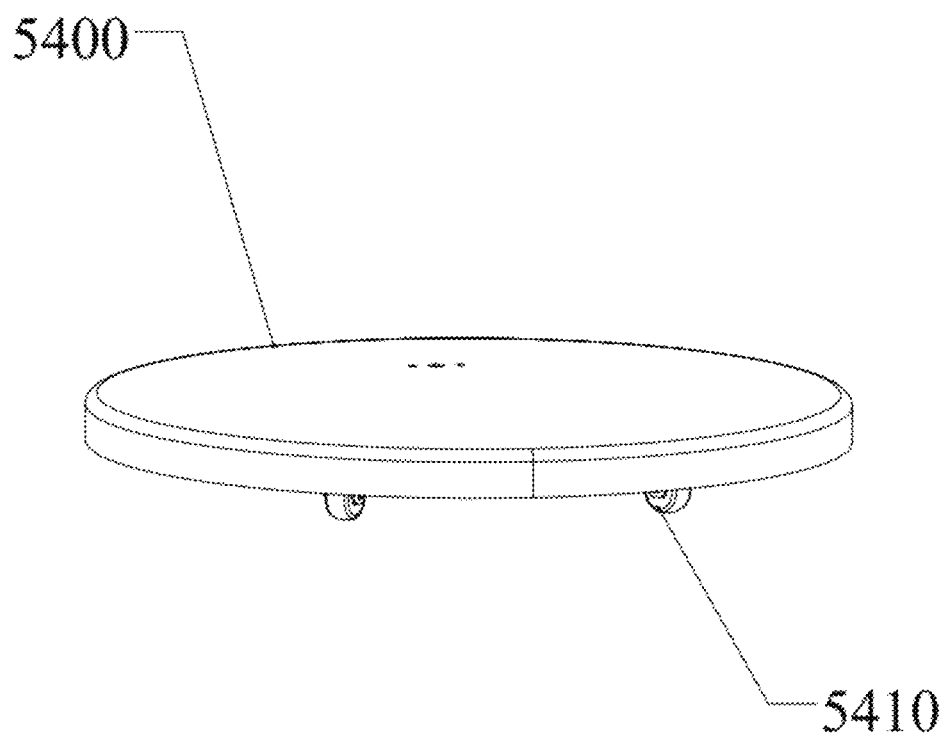
FIG. 18 is a schematic diagram of the fixed seat in this invention application.

As shown in FIG. 18, fixed seat 5400 is circular in shape. There is a hole connecting to support rod on top of fixed seat and multiple mobile devices at bottom. In this embodiment, mobile devices are omnidirectional wheel structures. In some embodiments (not shown), mobile devices can also be sliders or chains or other devices that can support monitor bracket and make it movable.

Specifically, when using the monitor bracket 4000, the fixed seat 5400 is a floor device. The fixed seat 5400 is equipped with omnidirectional wheels, so that the fixed seat 5400 can move in all directions. Then, the support rod 5300 is detachably fixed on the top of the fixed seat 5400, the lifting device 5200 is sleeved on the periphery of the support rod 5300, and the lifting device 5200 is connected to the connector block 3200 and fixed by a nut connection, thereby completing the assembly of the monitor connector 1000 and support component 5000. After assembly, you can adjust the height of the monitor in the vertical direction by adjusting the lifting device 5200; you can adjust the use angle of the monitor in all directions through connector 1000. Comprehensive adjustments can adapt to different viewing angles and postures, improving user comfort and efficiency.

Figure 19:
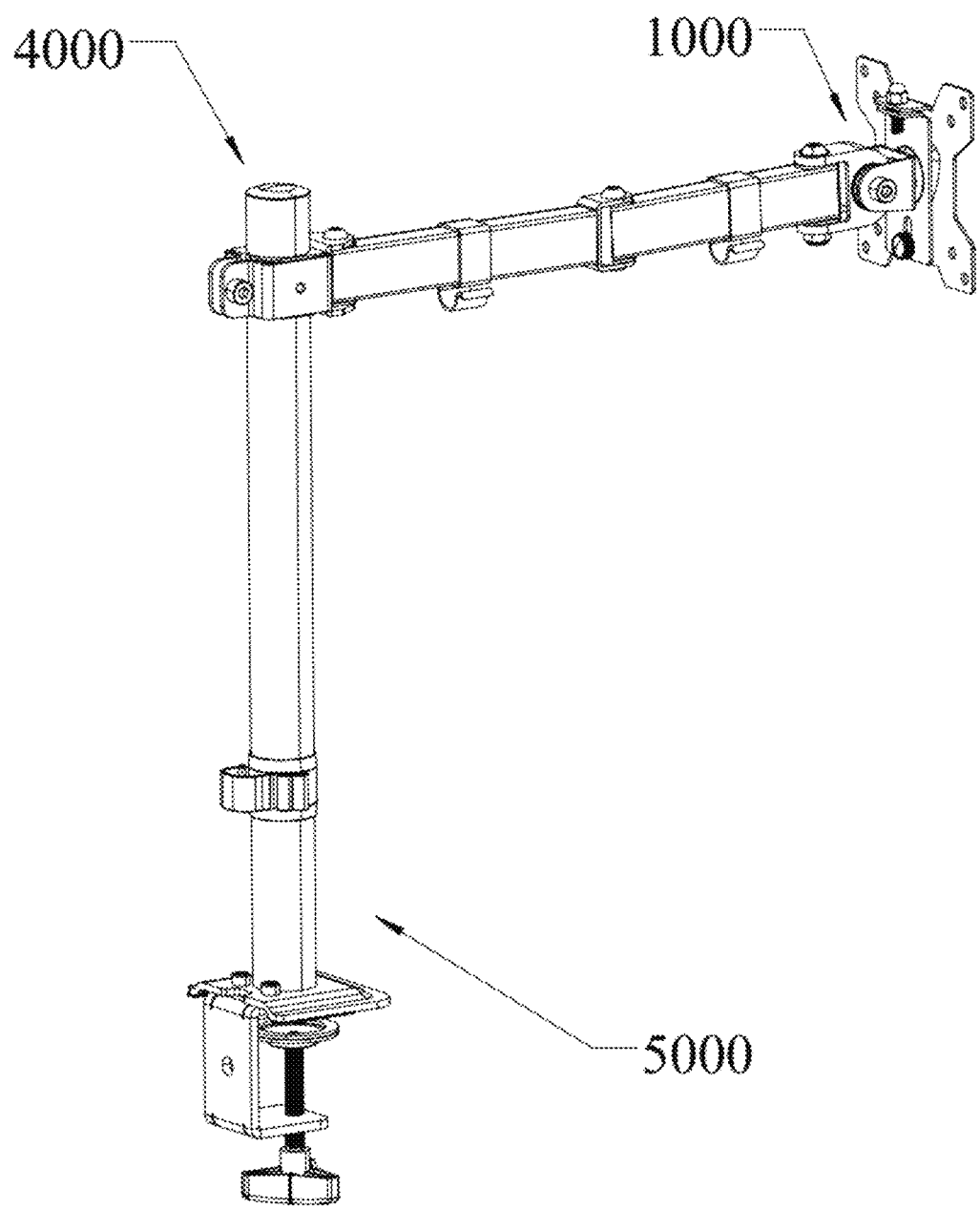
FIG. 19 is a schematic diagram of another embodiment of the monitor bracket in this invention application.
Figure 20:
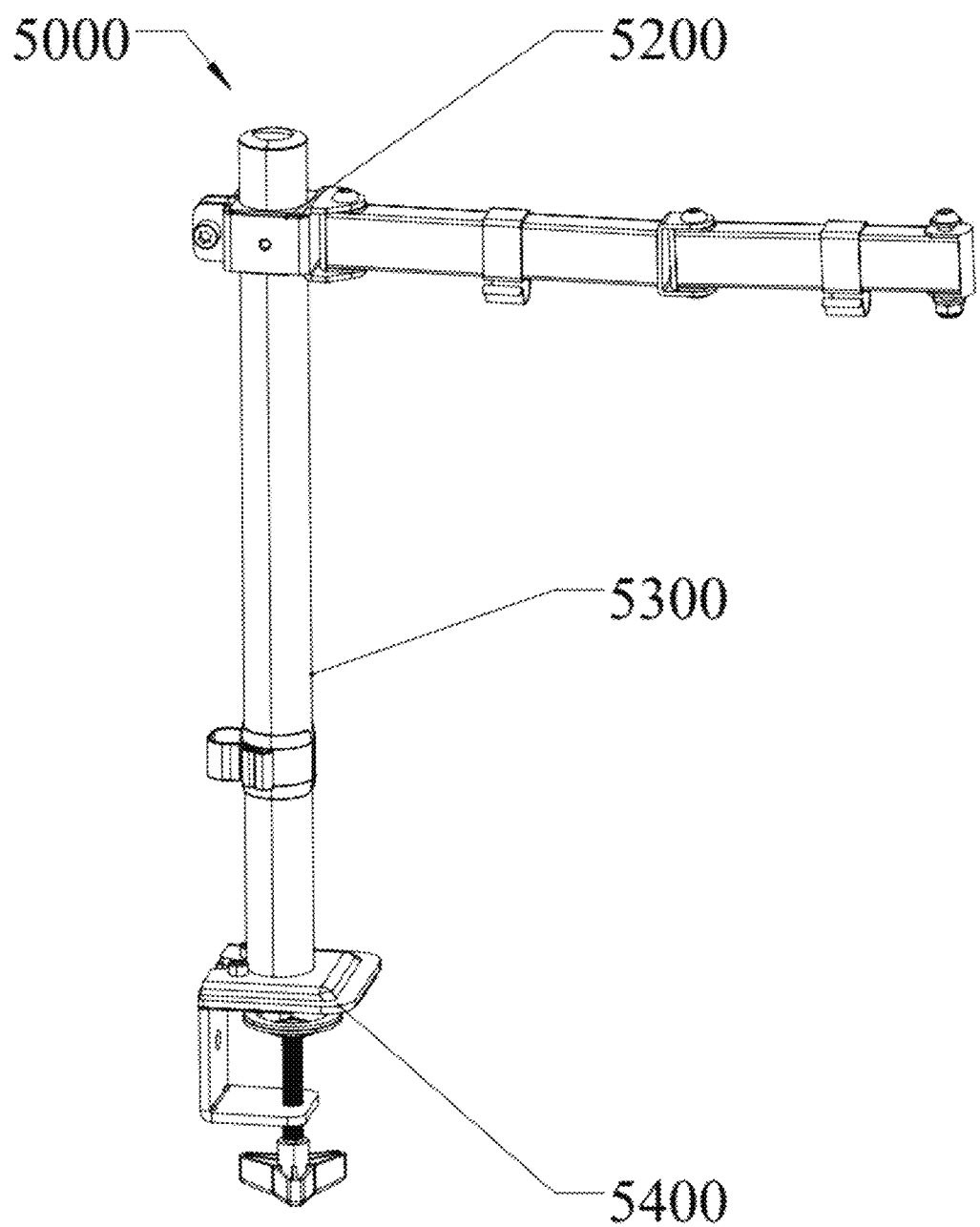
FIG. 20 is a schematic diagram of another embodiment of the support component in this invention application.

In some other embodiments, the monitor bracket can also be set as a desktop monitor bracket. As shown in FIGS. 19 and 20, the monitor bracket 4000 includes a monitor connector 1000 and a support component 5000. The support component 5000 includes a support arm, a lifting device 5200, a support rod 5300, and a fixed seat 5400.

As shown in FIG. 19, the support arm consists of two short arms. The short arms are detachably connected by threads. The support arm can rotate and bend to adjust the distance between the monitor and the user.

As shown in FIG. 20, when the middle pail of lifting device 5200 is a roughly cylindrical hollow structure and support rod 5300 is a solid cylindrical structure inserted inside it, lifting device 5200 is sleeved on periphery of support rod. Lifting device has bolt reinforcement structure that locks and reinforces four sides of support rod to form circumferential fixation. Bolt reinforcement not only achieves detachable connection for easy maintenance and replacement of parts, improving lifespan and efficiency, but also adapts to parts of different shapes and sizes with strong universality and flexibility. It also disperses stress at connection points to reduce risk of stress concentration and fatigue cracks while saving material and process costs, reducing connection weight and noise. In some embodiments (not shown), reinforcement method for lifting device on support rod can be adhesive method or welding method or riveting and other fixed methods.

Figure 21:
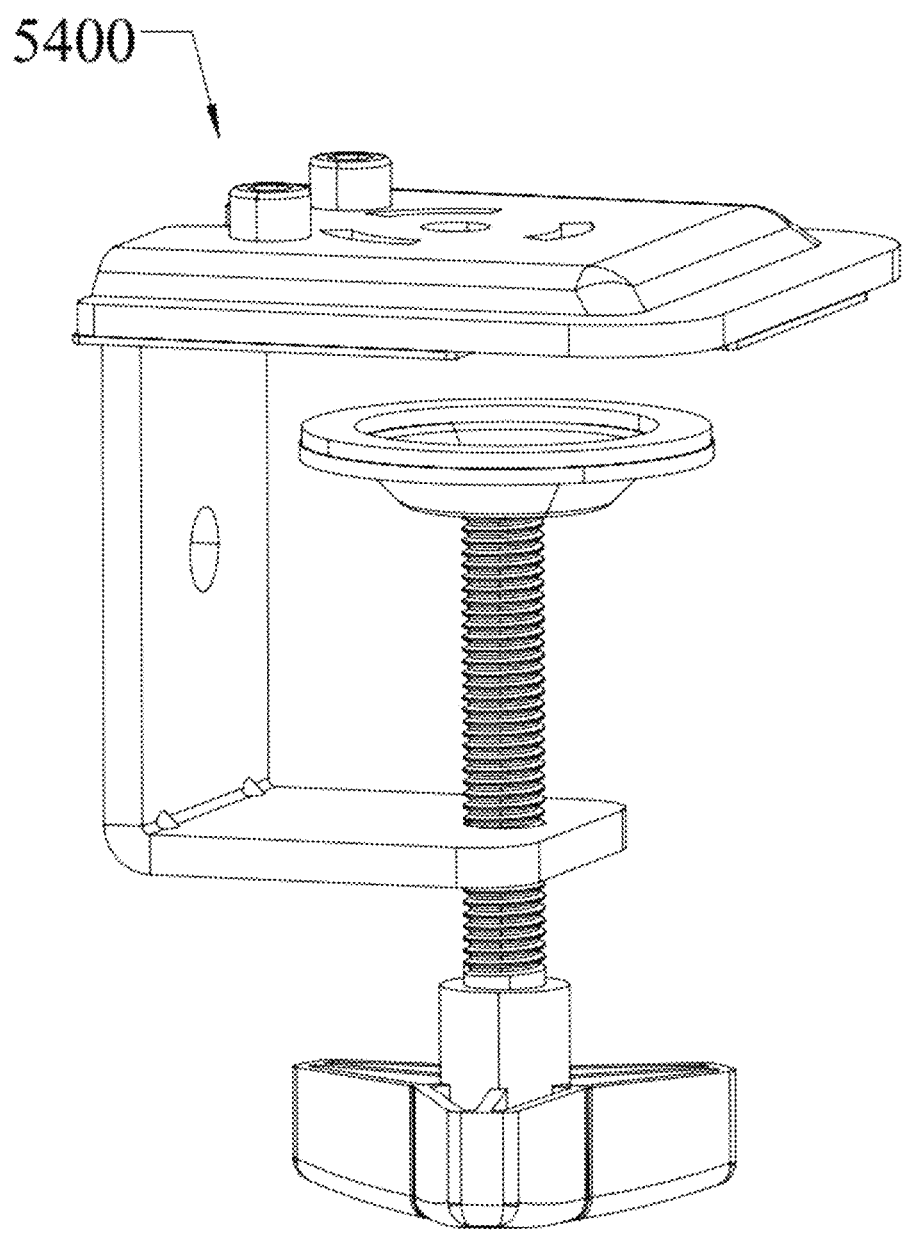
FIG. 21 is a schematic diagram of another embodiment of the fixed seat in this invention application.

As shown in FIG. 21, the fixed seat 5400 includes a support part and a U-shaped plate. The support part consists of a knob, a threaded rod, and an adsorption device. The knob is set at the bottom of the threaded rod and is used to control the rotation of the threaded rod. The adsorption device is installed at the top of the threaded rod. During the fixing process, it can make the fixed seat 5400 fixedly adsorbed at the bottom of the table. The adsorption device is hemispherical and cannot damage the structure of the table during the adsorption process. The support part is fixed on the U-shaped plate.

The U-shaped plate is roughly "U"-shaped, with a connection part with support rod 5300 set at the top and an internal threaded hole set at the bottom for rotating use by the support part. In some embodiments (not shown), the shape of the U-shaped plate can also be T-shaped, L-shaped, trapezoidal shape, or other character and geometric shapes, as long as it can make the U-shaped plate have sufficient support strength.

Specifically, when using monitor bracket 4000, fixed seat 5400's U-shaped plate will enclose the edge of table inside. Support part can be adjusted according to thickness of desktop with an adjustment thickness of 3 cm-20 cm. By rotating threaded rod of support part, adsorption device is made to fit with bottom of desktop so that fixed seat 5400 is fixed on desktop. After fixing fixed seat 5400, support rod 5300 is detachably fixed on top of fixed seat 5400, lifting device 5200 is sleeved on periphery of support rod 5300, one end of support arm connects to lifting device 5200, and other end is located between two vertical connection holes 3240 of connector block 3200. It is fixed by nut connection to complete assembly of monitor connector 1000 and support component 5000. After assembly, you can adjust height of monitor in vertical direction by adjusting lifting device 5200; you can rotate and bend support arm to adjust distance between monitor and user; you can adjust use angle of monitor in all directions through monitor connector 1000, Comprehensive adjustments can adapt to different viewing angles and postures, improving user comfort and efficiency.

In this embodiment, the fastener connection used in the application of this invention is a threaded connection or bolt connection. The threaded connection or bolt connection can not only achieve detachable connections, facilitate maintenance and replacement of parts, improve lifespan and efficiency, and adapt to parts of different shapes and sizes with strong universality and flexibility, but also disperse stress at connection points, reduce the risk of stress concentration and fatigue cracks, save material and process costs, reduce connection weight and noise. In other embodiments (not shown), the connection method can also use buckle connection, magnetic attraction connection, latch connection and other methods for connection. As long as it can make the monitor bracket connect and fix. At the same time, the rigid material used in the application of this invention is aluminum alloy material. In some embodiments, the material can also be carbon steel or plastic or other materials with rigidity.

In this embodiment, the monitor bracket is a kind of installation rack that can fix monitors, laptops or computer monitors. It can replace the original monitor bracket, has more functions, and meets higher requirements of people.

In some embodiments (not shown), the monitor bracket can also be used in office, entertainment, education, or some special occasions and other fields. For example, in the medical field, the monitor bracket can be used for the monitor of medical equipment, which is convenient for doctors and nurses to observe patients' vital signs, examination results and other information. The monitor bracket can also be used for the monitor in the operating room to help doctors perform precise surgical operations. Or in the industrial field, the monitor bracket can be used for the monitor of industrial control systems, which is convenient for engineers and operators to monitor and control production processes and equipment status information. The monitor bracket can also be used for the monitor of industrial robots to improve the flexibility and efficiency of robots. Or in the military field, the monitor bracket can be used for the monitor of military equipment, which is convenient for soldiers and commanders to observe battlefield conditions, target positions and other information. The monitor bracket can also be used for the monitor of drones to enhance the controllability and safety of drones. Or it can be used in other fields that use monitors.

In summary, through a unique design structure, this invention application makes the monitor connector have a quick assembly structure, which is convenient for quick connection and disassembly between the connector and the monitor. At the same time, this monitor connector enhances its load-bearing capacity and improves its connection stability. It is not easy to shake. It can adapt to different occasions and needs, providing people with a better visual experience and work efficiency.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A monitor connector, comprising:
a panel component and a connection component, wherein
said panel component is composed of a panel and a panel connector, where said panel and said panel connector are respectively equipped with a first quick assembly structure and a second quick assembly structure, said first quick assembly structure and said second quick assembly structure are detachably connected, constructed as a quick assembly structure; and
said connection component includes a U-shaped connector and a connector block, where one side of said U-shaped connector is equipped with a polygonal hole, said connector block has at least two grooves opened in a horizontal direction, said at least two grooves is embedded with a hemispherical plastic part, said hemispherical plastic part is connected with a polygonal gasket, said polygonal hole is embedded with a polygonal nut to form fixation; and
wherein, said polygonal nut rotates with a rotation of said U-shaped connector, said panel connector and said U-shaped connector are connected by multiple gaskets and fasteners to form a riveting connection method, making said panel component and said connection component detachably connected.

2. The monitor connector according to claim 1, wherein said panel is provided with multiple threaded holes, and said threaded holes penetrate said panel.

3. The monitor connector according to claim 1, wherein said panel is coupled with the monitor and is constructed and configured to be fixed on a back of a monitor by fasteners.

4. The monitor connector according to claim 3, wherein said panel connector includes a first position and a second position, and said first position is close to said panel.

5. The monitor connector according to claim 4, wherein an adjustment hole is constructed under said panel connector, and said panel and said panel connector are adjusted for tightness through said adjustment hole.

6. The monitor connector according to claim 1 further comprising:
an adjustment hole equipped with a fastening knob, and said fastening knob and said adjustment hole are detachably connected.

7. The monitor connector according to claim 6, wherein a first connector, a second gasket, and a third gasket are arranged between said panel connector and said U-shaped connector, and said panel connector and said U-shaped connector are detachably connected through said first connector, said second gasket, and said third gasket.

8. The monitor connector according to claim 7, wherein said first connector is located at a first position, said second gasket is in contact with a second position and said U-shaped connector, and said second gasket is attached to an inner surface of said U-shaped connector.

9. The monitor connector according to claim 8, wherein said U-shaped connector is approximately "U"-shaped, and another side of said U-shaped connector is set as a round hole, and said round hole and said polygonal hole form a concentric structure.

10. The monitor connector according to claim 9, wherein there is a cylindrical raised part on said hemispherical plastic part, a plug-in hole is set on said polygonal gasket, said plug-in hole is sleeved on said raised part.

11. The monitor connector according to claim 10, wherein an interior of said connector block is a hollow structure, and said connector block is provided with at least two connection holes in a vertical direction.

12. The monitor connector according to claim 11, wherein said connector block is connected inside said U-shaped connector, and said connector block and said U-shaped connector are rotationally connected.

13. The monitor connector according to claim 12, wherein said U-shaped connector and said connector block are detachably connected by fasteners, and the fasteners are inserted from one end of said round hole.

14. A monitor bracket, comprising:
a monitor connector and a support component, wherein
said monitor connector includes a panel component and a connection component, said panel component is composed of a panel and a panel connector, said panel and said panel connector are respectively equipped with a first quick assembly structure and a second quick assembly structure, said first quick assembly structure and said second quick assembly structure are detachably connected, constructed as a quick assembly structure, said connection component includes a U-shaped connector and a connector block, one side of said U-shaped connector is equipped with a polygonal hole, said connector block has at least two grooves opened in a horizontal direction, and at least two connection holes in the vertical direction, said at least two grooves is embedded with a hemispherical plastic part, which is connected with a polygonal gasket, said polygonal hole is embedded with a polygonal nut to form fixation, said polygonal nut rotates with a rotation of said U-shaped connector, said panel connector and said U-shaped connector are connected by multiple gaskets and fasteners to form a riveting connection method, making said panel component and said connection component detachably connected; and
said support component includes a lifting device, a support rod inserted in said lifting device, and a fixed seat, said support rod is fixed at a top of said fixed seat, said fixed seat is constructed to fix and support said monitor bracket; and
one end of said lifting device is detachably connected to said connector block by fasteners, connecting said monitor connector and said support component.

15. The monitor bracket according to claim 14, wherein an other end of said lifting device is connected with a first shelf, and said first shelf is detachably connected with said lifting device through fasteners.

16. The monitor bracket according to claim 15, wherein said support rod is cylindrical in shape and has a hollow structure inside, said support rod is detachably fixed above said fixed seat by fasteners.

17. The monitor bracket according to claim 16, wherein said lifting device includes a roughly cylindrical hollow structure, said lifting device is sleeved around said support rod, and is locked and reinforced to said support rod through bolt connection, forming a radial fixation.

18. The monitor bracket according to claim 17, wherein a second shelf is sleeved on an outer surface of said support rod, and said second shelf is detachably connected with said support rod through fasteners.

19. The monitor bracket according to claim 18, wherein said fixed seat is equipped with multiple mobile devices, and said mobile devices are evenly distributed at a bottom of said fixed seat.

20. The monitor bracket according to claim 19, wherein said monitor bracket is made of rigid material.

* * * * *